United States Patent [19]

Wenzel

[11] Patent Number: 4,557,020
[45] Date of Patent: Dec. 10, 1985

[54] DEVICE FOR ALIGNING FISH

[75] Inventor: Werner Wenzel, Lübeck, Fed. Rep. of Germany

[73] Assignee: Nordischer Maschinenbau Rud. Baader GmbH & Co. KG, Lübeck, Fed. Rep. of Germany

[21] Appl. No.: 520,111

[22] Filed: Aug. 3, 1983

[30] Foreign Application Priority Data

Aug. 7, 1982 [DE] Fed. Rep. of Germany ....... 3229502

[51] Int. Cl.⁴ ............................................. A22C 25/08
[52] U.S. Cl. ............................................. 17/55; 17/24
[58] Field of Search ........................... 17/60, 63, 55, 24

[56] References Cited

U.S. PATENT DOCUMENTS 1,326,905 1/1920 Birch, Jr. ................................. 17/60
1,814,983 7/1931 Urschel .................................... 17/63
3,550,192 12/1970 Ericksson ................................. 17/55

Primary Examiner—Willie G. Abercrombie
Attorney, Agent, or Firm—Edward F. Levy

[57] ABSTRACT

A device for arranging fish in uniform head-tail alignment comprises a rotating gripping device of radially arranged pincer-like gripping elements. These form a vertical slot into which the fish led tail end first are introduced. Following the rotation of the gripping device the gripping elements are held closed in a region of a stationary sector of each one revolution so that the tail fin is grasped and the fish carried along thereby. After passing the highest point of the revolution of the gripping device the fish turns over under the effect of gravity and is then released head end leading. Fish led head first cannot enter the slot because of their thicker heads and are passed on directly.

5 Claims, 5 Drawing Figures

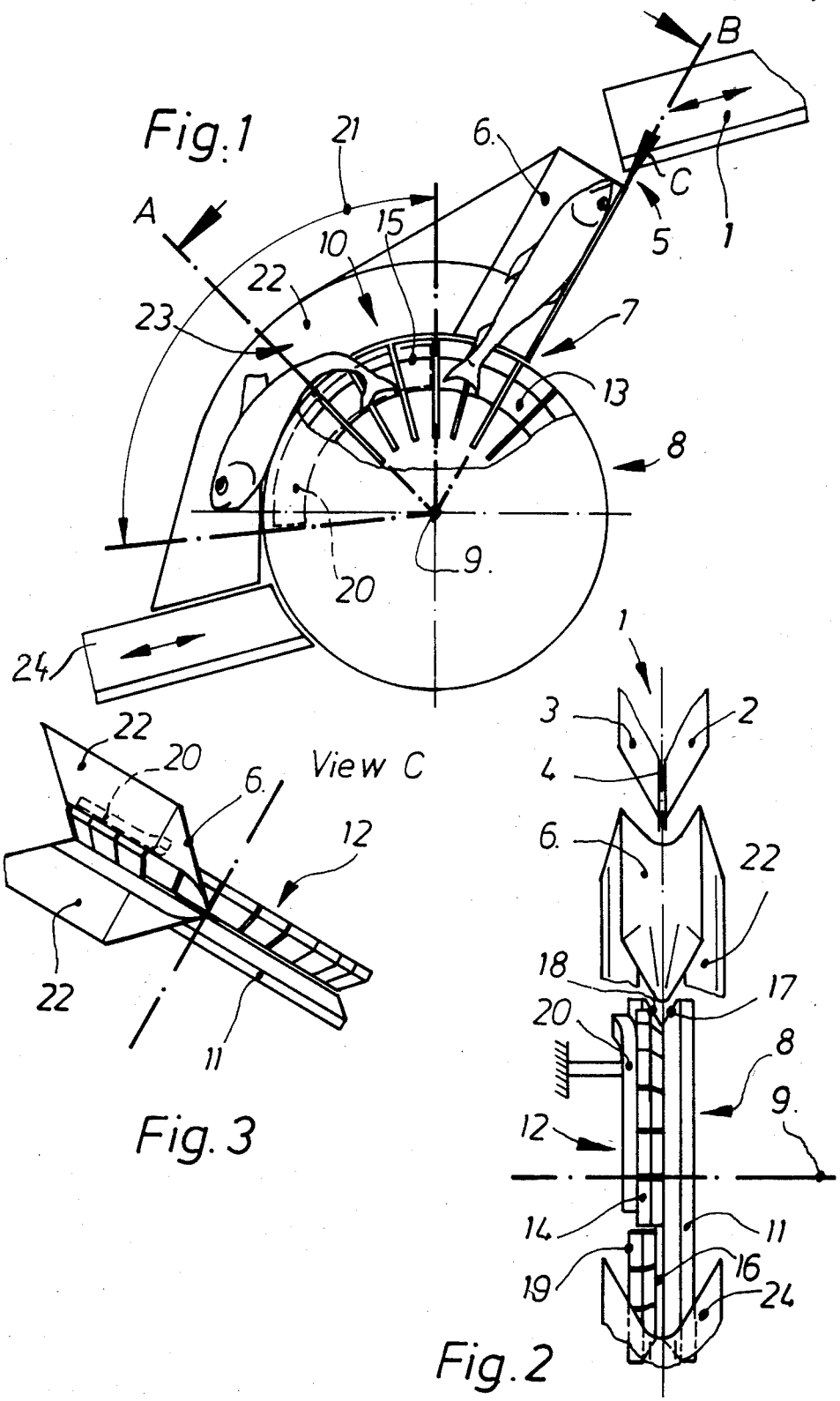

DEVICE FOR ALIGNING FISH

BACKGROUND OF THE INVENTION

1. Field of the Invention

The invention concerns a device for arranging in a uniform head-tail alignment fish being fed at random and conveyed in the direction of their longitudinal axes by turning such fish which are moving with their tail end leading, the device comprising at least feeding means, outlet means and a driven seizing and turning arrangement for seizing the tail region of the fish whose tail end is leading and for turning the same, this seizing and turning arrangement being associated to the feeding means and the outlet means and comprising gripping means turning about an essentially horizontal axis, having a plurality of pincer-like elements, and defining a clamping slot.

2. Description of Prior Art

Such devices are known, e.g. in the form of a device for arranging fish (see Swedish Pat. No. 211 584) in which a turning device arranged above a feeding chute for turning fish running tail end leading to run head end leading is used. This turning apparatus consists of a rotatingly driven gripper with a fixed and moveable gripper arm, the latter being held resiliently in open position. While the first gripper arm has an orbit nearly tangential to the feeding chute, the mobile one is displaced against the force of the spring into closed position with the fixed gripper arm when it approaches the feeding chute. A pulse or timing device ensures the release of a fish when the gripper is in the ready position so that the fish are led seperately to the waiting gripper opening which runs parallel to the feeding chute. Only fish sliding tail first can enter the gripper opening while the fish running head end leading are held back by the fixed gripper arm. The fish caught in this manner by its tail in the further circulation of the gripper is pulled free from the feeding chute and released after reaching the suspended position, i.e. head end leading. The fish already orientated head end leading is also released in this position due to the diverging movement of the gripper relative to the feeding chute.

This device has not been used in practice, on the one hand because it cannot be ensured that the tail fin reaches the gripper opening and on the other it cannot be avoided that single fish, especially little single fish are seized by their body and damaged by squeezing.

Furthermore there is known a device for turning fish moving with their tail end leading (see German Utility Model No. 81 29 197). This device works according to the mentioned clamping principle and comprises clamping means driven to rotate about a horizontal axis and having a plurality of clamping elements forming a clamping slot perpendicular with respect to the axis. This device includes a feeding channel having a gap at its base. The feeding channel is arranged such that the gap lies flush with the clamping slot and points towards a portion of the latter with its opened clamping elements. The feeding channel is provided with a lateral opening at the junction position with the clamping means, which opening opens into an outlet chute extending along the side of the clamping means.

In practice it has become evident that this device does not safeguard the necessary function to a sufficient extent. The main reason for this is that particularly the tail fins of bent or curved fish, that is fish which have been deformed for various reasons, will miss the clamping slot of the clamping means and thus be guided directly to the outlet chute, i.e. in the same manner as those fish which arrive with their head ends leading.

3. Objects of the Invention

It is therefore a basic main and essential object of the invention to improve the known fish alignment devices.

It is, in particular, an essential and main object of the invention to provide for an alignment device which has a compact structure and ensures seizing fish orientated tail end leading safely at a high throughput rate, gripping them carefully and releasing them in a turned position.

SUMMARY OF THE INVENTION

According to the invention this object is achieved by a device comprising at least feeding means for feeding the fish, outlet means for delivering the fish from the device and a driven seizing and turning arrangement for seizing the tail region of the fish whose tail end is leading and for turning such fish, this seizing and turning arrangement being associated to the feeding means and the outlet means to provide junction positions with the feeding means and the outlet means and comprising gripping means turning about an essentially horizontal axis, thus defining a plane of rotation, the gripping means including a plurality of pincer-like elements and defining a clamping slot and a clamping slot plane, wherein the feeding means and the outlet means are lying flush with the plane of the clamping slot, wherein the clamping slot is adapted to be closed in a portion of a stationary sector of the gripping means, this sector extending between the junction positions of the feeding means and the outlet means with the gripping means, and wherein the clamping means are provided with a groove pointing towards the clamping slot.

The special advantages to be achieved by such a device reside above all in that the tail fin, even fins of strongly deformed fish can be seized safely and reliably, whereby it is possible to reduce the number of errors occurring in aligning the fish considerably, even at a high throughput rate. Moreover the fish are seized most carefully by this device and need only be tilted about 90°. Thus, the stress exerted on the fish is minimized and a treatment is obtained that does not entail the danger of the tail fin breaking, which often occurs in prior art machines.

In order to enable the guiding of the tail fin necessary for the entrance into the clamping slot of the grippping means the feeding means can be arranged to converge in the direction of the clamping slot at its end facing the gripping means.

Preferably the gripping means can comprise a rigid gripping plate and a lamellar plate divided into lamella by radial separating slots, while, in order to close the lamella these can be held resiliently against the gripping plate within the stationary sector by means of a curve or cam bar fixedly arranged on the frame of the device. This results in a simple and compact construction of the apparatus.

Advantageously, the gripping means can be surrounded by guiding surfaces arranged fixedly on the frame of the device essentially in the region of the stationary sector, the guiding surfaces forming a transition channel extending in the plane of rotation of the gripping means for the safe lateral guiding of the fish. This enables a particularly careful transition of the fish from the feeding means to the outlet means.

In order to improve the throughput of the device a fish supplying channel driven to oscillate and transmitting the fish singly to the feeding means may advantageously be arranged upstream of the feeding means.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the scope of the appended claims.

FIG. 1 is a side elevational view of the device of the present invention with portions thereof removed and broken away to reveal inner constructional detail;

FIG. 2 is a front elevational view of the device of FIG. 1 as viewed from the left hand side thereof;

FIG. 3 is an enlarged top view of the feeding channel and guiding surfaces, showing their relationship to the gripping structure, as seen along the line indicated by arrow C of FIG. 1;

DETAILED DESCRIPTION OF THE PREFERRED EMBODIMENT

Figure 5:
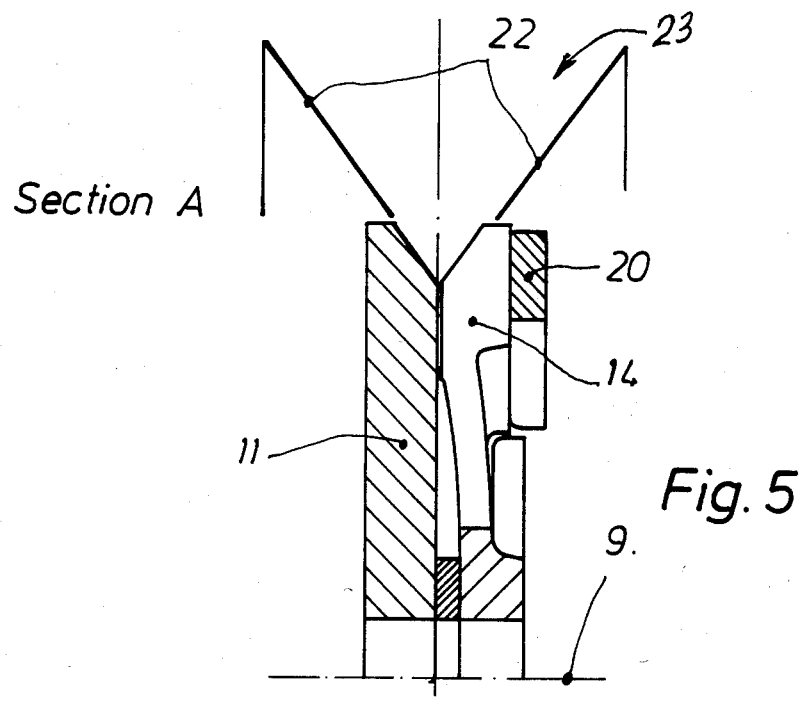
FIG. 5 is a section taken along line A of FIG. 1 and showing the clamping slot in closed position.
Figure 4:
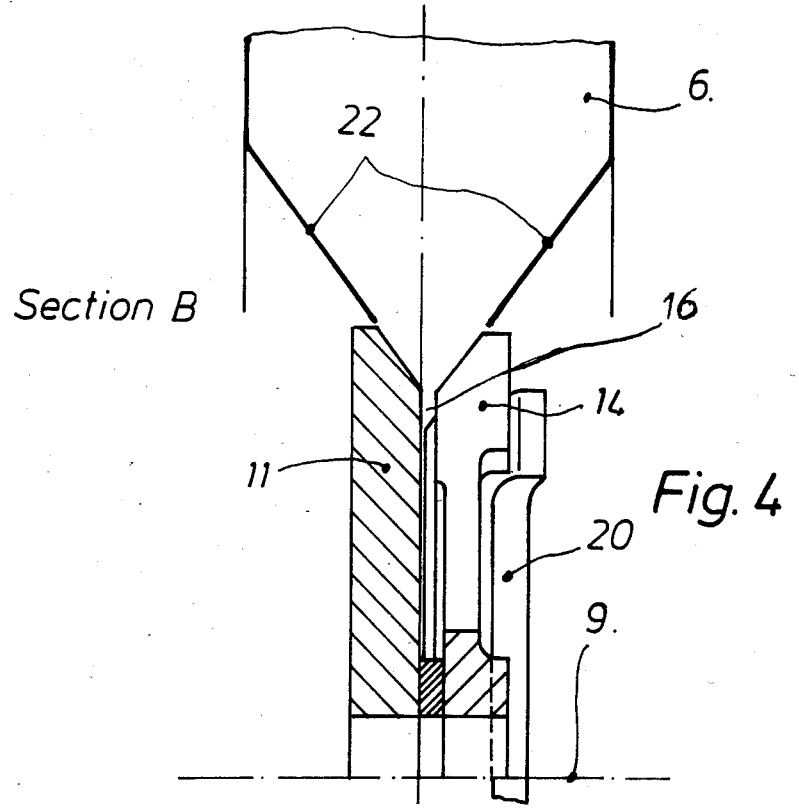
FIG. 4 is a section taken along line B of FIG. 1, and showing the clamping slot in open position.

A fish supplying chute 1 which extends at an inclination and comprises two wall parts 2, 3 arranged in V-shape is arranged in a not-shown frame of a device for putting fish in uniform order with respect to their head-tail position. The wall parts 2, 3 are driven independently of each other in an appropriate manner, preferably to oscillate in opposite directions, and leave a narrow, shaft-like gap 4 in their base. At the lower end 5 of chute 1 there is arranged a more steeply placed feeding channel 6 having an almost trapezoidal cross-section. The lower end 7 of this feeding channel 6 is so associated to a seizing and turning arrangement 8 driven to rotate about a horizontal axis 9 that the bottom of the feeding channel 6 essentially points towards the axis 9. The seizing and turning device 8 comprises a gripping structure or arrangement 10 formed by a rigid gripping plate 11 fixed to the axis 9 and by a lamellar plate 12 arranged at a distance to the gripping plate on the axis 9 and rotating with the latter. The lamellar plate 12 comprises a plurality of lamella 14 whose heads 15 form a rotational body having the diameter of the gripping plate 11. The lamella 14 are formed by radial separating slots, form pincer-like elements 13 and are held biassed by not-shown springs in such a way that an open clamping slot 16 is located between the gripping plate 11 and the lamellar plate 12. This clamping slot 16 is limited along its periphery by bevels 17 and 18 which form a groove not designated as such for the sake of simplicity. The lamella 14 have outer flanks 19 to which they are operationally resp. functionally connected and a curve or cam bar 20 fixed to the frame of the device and arranged coaxially to the axis 9. This functional connection is such that a deformation of the lamella 14 occurs in a sector 21 stationary therewith and extending with the rotational direction over an angle of approximately 90° from the connection position with the feeding channel 6. This deformation closes the clamping slot 16. The lower end 7 of the feeding channel 6 opposing the clamping slot 16 is of narrow design so that the cross-section of feeding channel 6 in this area is adapted to the groove formed by the bevels 17 and 18. Guiding surfaces 22 arranged fixedly on the frame are provided on both sides of the clamping structure 10 and its periphery and surround the periphery thereof to form a connection to the feeding channel 6. These guiding surfaces 22 form a transition channel 23 extending in the rotary surface of the gripping structure 10, the clamping slot 16 being positioned at the bottom of the transition channel 23. The latter runs into an outlet chute 24 secured to the frame of the device.

The operation and function of the device according to the invention is the following:

The fish to be arranged in order, e.g. for the purpose of automatic delivery to a fish processing machine are fed to the supplying chute 1 in an appropriate manner and, due to the inclination and oscillating movement of the latter, led in the direction of their longitudinal axes to the feeding channel 6, through which they are delivered to the seizing and turning device 8. When they arrive at this device a differing handling of the fish occurs according to whether they contact resp. strike the gripping structure 10 of this device head or tail first. While the fish which glide head end first will not penetrate the clamping slot 16 due to the blunt form of the head and are pushed out of the feeding channel 6 due to the design of the lower end 7 of the latter into the transition channel 23 formed by the guiding surfaces 22, the tail fin of any fish arriving tail end leading as shown in the upper part of FIG. 1 will penetrate the clamping slot 16. The rotation of the gripping structure 10 now effects that the outer flanks 19 of the lamella 14 contact the cam bar 20 so that the clamping slot 16 contracts under this impact and the tail fin placed therein is gripped resp. clamped. As shown in FIG. 1 the fish thus grasped is pulled into the transition channel 23 in the further course of rotation so that it clings to the periphery of the gripping structure 10 under the influence of gravity and by being guided laterally through the guiding surfaces 22. After passing the highest point of the revolution of the gripping arrangement 10 the fish is lifted more and more to stand on its tail until finally a tipping over into the hanging position (shown on the left of FIG. 1) takes place. From this position the fish is released by the fact that the lamella 14 of the gripping element 13 which holds the fish leaves the cam bar 20. The fish set free is then led head end leading into an outlet chute 24 and can then be guided, together with the fish already being conveyed head end leading to a beheading, nobbing or filleting machine.

If necessary, an alignment of the fish according to their belly-back position may be performed additionally before the delivery to one of the named processing machines. For this purpose appropriate prior art devices may be inserted if necessary. In order to increase the yield several of the described units can be arranged parallel to each other, the clamping structures, if possible being arranged to be supported and driven by a common axle.

What is claimed is:

1. A device for arranging in uniform head-tail alignment, a plurality of fish each having a body extending along a longitudinal axis between a head end and a tail region ending in a tail end, with said fish being led to said device along their longitudinal axes in a random head-leading and tail-leading orientation, and with said device being adapted to turn such fish as are led thereto with tail end leading to a head-leading position, said device comprising:

a feeding channel for receiving individually each of said fish led to said device, seizing and turning means for seizing the tail region of such fish as are received in the feeding channel in tail-leading position, and for turning such fish to head-leading position, outlet means for delivering said fish from said device, said feeding channel communicating with said seizing and turning means at a first junction position, and said outlet means communicating with said seizing and turning means at a second junction position, said seizing and turning means including a gripping member rotatably mounted about a substantially horizontal axis of rotation, said gripping member being formed with a plurality of gripping elements extending about the periphery thereof, said seizing and turning means also including a rigid gripping plate normally spaced from said gripping member and defining a clamping slot therebetween, with said feeding channel and said outlet means communicating with said clamping slot, said gripping member being rotatable relative to said gripping plate to move said gripping elements through a stationary sector extending between said first and second junction positions, and means for deforming said gripping elements inwardly toward said gripping plate in said stationary sector, whereby to reduce the width of said clamping slot and cause said gripping elements to grip a fish tail portion located within said slot against said gripping plate, at least one of said gripping member and gripping plate being formed with a bevelled peripheral surface forming a tapered recess leading to said clamping slot.

2. A device according to claim 1 in which the end of said feeding channel which faces said gripping member converges toward said clamping slot.

3. A device according to claim 1 in which said gripping member comprises a substantially circular lamellar plate, and in which said gripping elements comprise lamella formed in said lamellar plate by radial separating slots, and in which said deforming means comprises a cam bar extending along said stationary sector for pressing said lamella against said gripping plate.

4. A device according to claim 1 in which said gripping member is bordered on each side by a respective guiding surface secured to said device in the region of said stationary sector, said guiding surfaces forming therebetween a transition channel extending in the plane of rotation of said gripping member for guiding said fish.

5. A device according to claim 1 which also includes oscillatingly driven fish supplying means located upstream of said feeding channel for transmitting said fish singly to said feeding channel.

* * * * *